Sept. 11, 1934.　　　　A. MOORHOUSE　　　　1,972,943
SHOCK ABSORBER
Filed Nov. 28, 1927　　　2 Sheets-Sheet 1
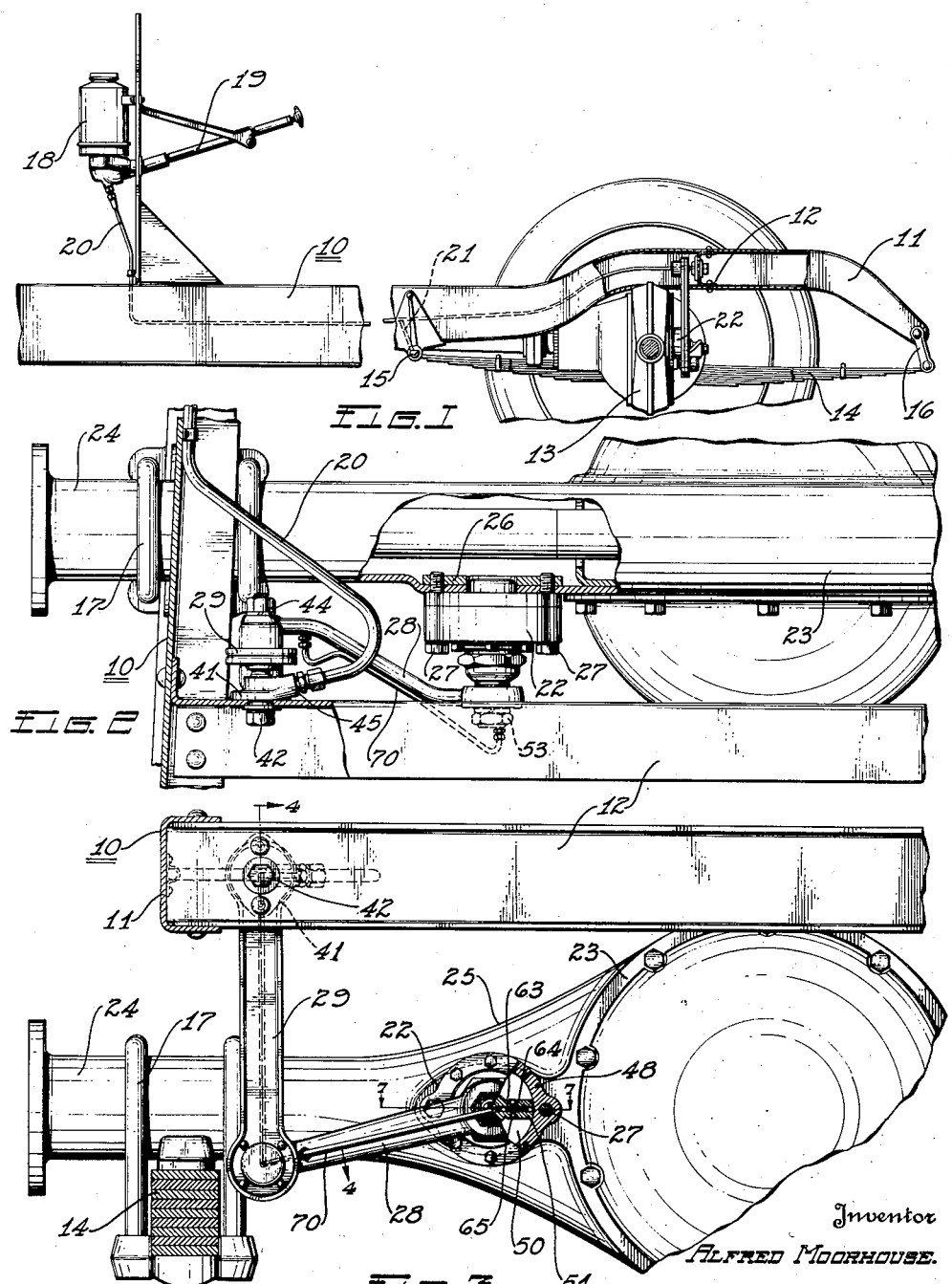

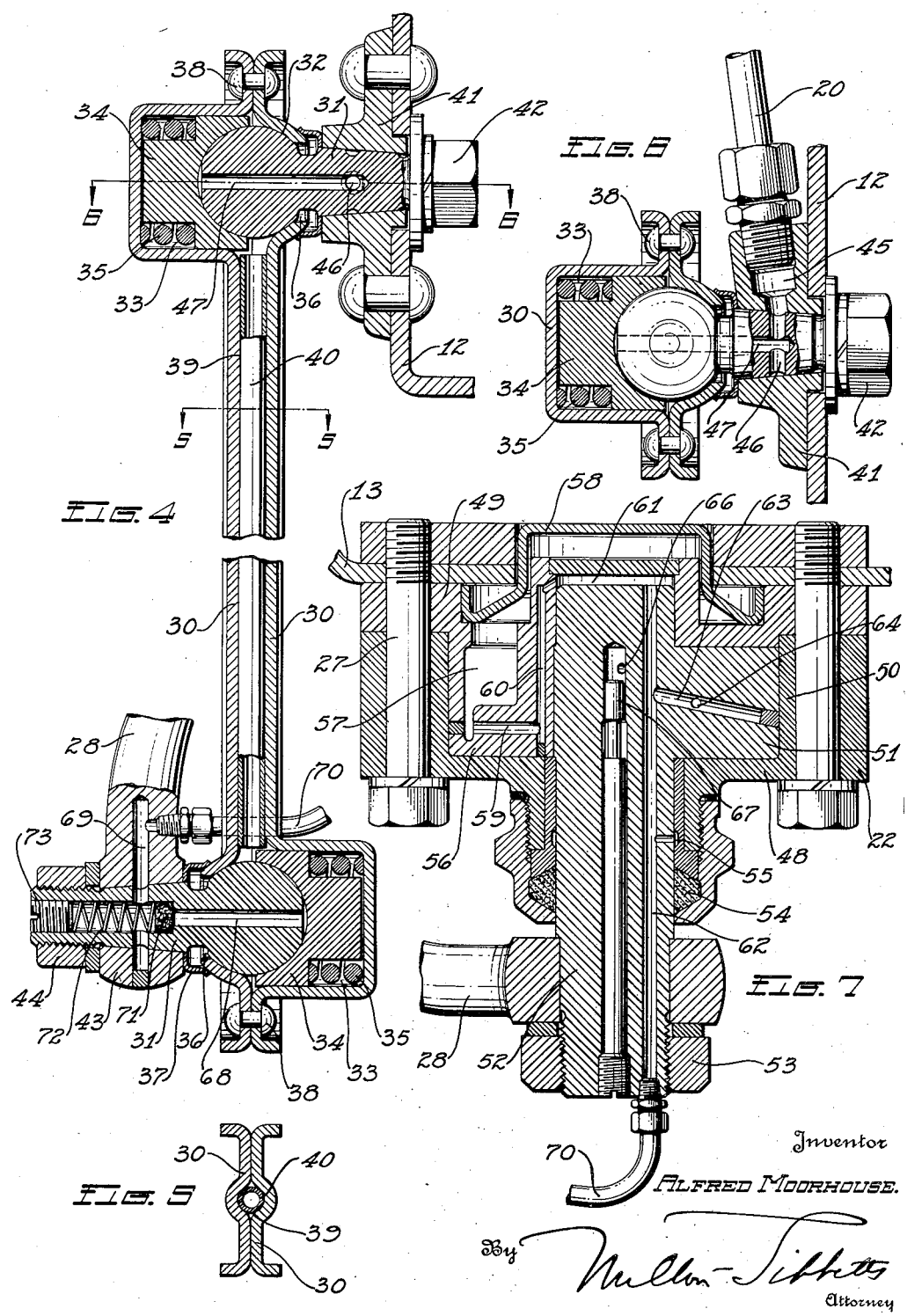

Patented Sept. 11, 1934

1,972,943

UNITED STATES PATENT OFFICE 1,972,943

SHOCK ABSORBER

Alfred Moorhouse, Detroit, Mich., assignor to Packard Motor Car Company, Detroit, Mich., a corporation of Michigan Application November 28, 1927, Serial No. 236,047

14 Claims. (Cl. 188—89)

This invention relates to motor vehicles and particularly to shock absorbing means and connections therefor and their mountings on the vehicle.

One of the objects of the invention is to provide a built-in shock absorber construction for a motor vehicle in lieu of the conventional bracket attachments.

Another object of the invention is to provide a hydraulic shock absorber with means for readily adding fluid thereto from an external source.

Another object of the invention is to provide a hydraulic shock absorber with means, in addition to the usual auxiliary reservoir, for supplying additional fluid from a source outside the shock absorber.

Another object of the invention is to provide a shock absorber connection of novel and efficient design to adequately serve the purpose of operatively connecting the shock absorber to the relatively moving parts of the vehicle.

Another object of the invention is to provide novel and permanent mounting and connections for a shock absorber on a vehicle.

Other objects of the invention will appear from the following description taken in connection with the drawings, which form a part of this specification, and in which:

Fig. 1 is a side elevation, partly in section, of the rear portion of a motor vehicle embodying the invention;

Fig. 2 is a somewhat enlarged plan view of parts of the axle and frame, with portions thereof broken away to show the mounting of the shock absorber and lubricating means;

Fig. 3 is an elevation of the axle and frame parts shown in Fig. 2, with a portion of the shock absorber broken away to disclose its interior construction;

Fig. 4 is an enlarged view in section, substantially on the line 4—4 of Fig. 3;

Fig. 5 is a cross section through the connecting rod on the line 5—5 of Fig. 4;

Fig. 6 is a section through one of the joints of the connecting rod and its connection, on the line 6—6 of Fig. 4, and Fig. 7 is an enlarged sectional view through the shock absorber, substantially on the line 7—7 of Fig. 3.

Referring to the drawings, 10 is the vehicle frame having side members 11 and a cross member 12, and 13 is the rear or driving axle of the vehicle upon which the frame is supported through springs 14. The front end of each spring is pivoted to the frame at 15 and the rear end is shackled to the frame at 16. Intermediate its ends the spring is secured to the axle as by the U-bolts 17, shown in Figs. 2 and 3.

A chassis lubricator 18 is suitably mounted on the frame and it has a hand pump 19 by which oil or other lubricant is forced from the lubricator or supply tank through a pipe 20 to the various spring bearings and other parts of the vehicle. One of these connections is shown at 21 where the pivot 15 is lubricated. It is desirable that the piping 20 shall be kept on the frame itself because of the difficulties encountered in carrying it from the frame to the axles.

For controlling or modifying the action of the springs 14 a shock absorber 22 is provided. It will be understood that there are usually four of these shock absorbers, two for each of the axles, but one only is illustrated in the drawings. This shock absorber 22 is mounted on the axle with a strong and rigid connection so that it will not bind or weave and will stand the hard usage to which it is subjected. The axle itself comprises an enlarged middle portion 23, tubular end portions 24 and an intermediate tapered portion 25. The shock absorber 22 is mounted upon this intermediate portion and the pressed steel axle at this point is re-enforced by a backing plate 26, shown particularly in Fig. 2. The shock absorber rests against the axle and is secured thereto by bolts 27 extending through the axle and into the backing piece 26.

The operating arm 28 of the shock absorber extends outwardly towards the end of the axle and is connected to the frame by a connecting rod 29 of novel and unusually strong construction. This connecting rod and its joints are made up as a unit which is connected to and may be disconnected from the frame and shock absorber arm by its ball members.

The connecting rod, as shown herein, comprises two identical stampings 30, the body portions of which are of substantially channel section and the ends of which are formed to surround the ball brackets 31. Each stamped member has a spherical seat 32 at one end and a cylindrical recess 33 at the other, the recess of one member being arranged opposite the seat of the other. In each of these recesses is a bearing member or follower 34 with a spring 35 behind it pressing it towards the seat 32, and the ball part of the ball bracket 31 is arranged between this bearing member and the seat, as will be readily seen in Figs. 4 and 6. There is an opening 36 in each of the seats 32 and the shanks of the ball brackets 31 extend through these openings. A dust excluding member 37 surrounds the shank of the ball member to keep the joint clean. The stamped members 30 are secured together as by rivets 38 and this riveting is done after the ball members are in place between the stamped members.

The body portion of the connecting rod is formed with a longitudinal channel 39 between the stamped parts, and a tube 40 is placed in this channel before the parts are riveted together. This tube forms a conduit for lubricant from the upper to the lower joint.

The upper ball member 31 is mounted upon or connected to the frame, and in the present instance it is connected to the cross member 12. On the frame is riveted a small bracket 41 having an opening through which the shank of the ball member 31 passes and the ball member is secured in the bracket 41 by a nut 42. The lower ball member 31 is secured in the arm 28 of the shock absorber in a similar manner, the shank of the ball member passing through the eye 43 in the end of the arm 28 and being secured therein by a nut 44.

Since the shock absorber is mounted on the axle and the connecting rod extends downwardly from its joint with the frame to a joint with the shock absorber arm, lubricant for both joints may be fed from the chassis frame, and this is done by connecting the pipe 20 with an opening in the bracket 41, as shown at 45, Figs. 2 and 6. The ball member 31 is drilled out as shown at 46 and 47 so that the lubricant under pressure from the pipe 20 will pass through the ball member to the spherical surface thereof which is surrounded by the seat 32 and the bearing member 34. Excess lubricant will pass downwardly through the conduit 40 to the lower ball member and thereby lubricate the lower joint also. Thus, each time the pump 19 is operated to lubricate the various chassis bearings, some oil from the piping 20 will be carried to the upper and then the lower joint of the shock absorber connecting rod and keep these joints constantly in good working condition.

The shock absorber shown herein is of the hydraulic type comprising a casing 48 and a cover 49 which form an oil compartment 50 between them. A suitable abutment is provided and a piston 51 operates in the compartment 50 by means of its shaft 52 which extends through the casing 48 and has the arm 28 secured to its outer end as by the nut 53. Suitable packing 54 is provided around the shaft 52 and a leakage groove 55 is formed just inside the packing so that leakage oil will be drawn back into the shock absorber casing as will hereinafter appear.

The abutment above referred to is formed by an extension 56 on the cover 49, and this extension is cored out to form an auxiliary chamber 57, a cover for which is provided at 58. A conduit marked 59, 60, and 61 extends to a long conduit 62 in the shaft 52 so that oil may be supplied from the auxiliary chamber 57 in case of leakage from the shock absorber. Connecting with the conduit 62 is a passage 63 in the piston 51, and cross passages 64 from the passage 63 connect with the compartment 50 on both sides of the piston through check valves 65 that open towards the compartment.

With the above construction there is a constant suction on the conduit 62 as long as the shock absorber compartment or chamber 50 is not entirely filled with liquid, and this is because one of the check valves 65 will always be open on the low pressure side of the piston, that is, on the side of the piston which is retreating in the operation of the shock absorber. This suction in the conduit 62 tends to draw back into the shock absorber any oil that may escape into the leakage groove 55. It also tends to draw in additional liquid from the chamber 57 in case some oil leaks out of the shock absorber.

The shock absorber is also provided with a bypass 66 controlled by a plug 67 which is just enough smaller than the opening in which it is mounted to permit the desired amount of oil to pass from one side of the piston to the other.

Additional means for feeding oil to the shock absorber are provided in a connection from the chassis lubricator to the conduit 62 of the shock absorber. This is done through a passage 68 in the lower ball member 31, the passage 69 in the arm 28, and a pipe 70 connecting the passage 69 with the conduit 62, this pipe 70 extending lengthwise of the arm 28, as shown particularly in Figs. 2 and 3. A filter, preferably in the form of a felt washer 71 is provided in the ball member 31, as shown in Fig. 4, this filter being held in position by a spring 72 and a plug 73. Thus the oil fed to the lower joint will pass through the filter 71 and through the pipe 70 to the conduit 62, thus securing a supply of clean oil to the shock absorber at all times.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the combination of a hydraulic shock absorber having a fluid containing piston chamber, a link connection for the shock absorber, and means for supplying fluid to the shock absorber chamber through the link connection.

2. In a motor vehicle, the combination of a hydraulic shock absorber mounted on an axle, said shock absorber including a fluid containing casing and a piston, a link connection from the shock absorber piston to the frame, and means on the frame for supplying lubricant to the joints of the link connection and to the fluid in the shock absorber casing.

3. In a shock absorber, the combination of a casing, a piston moving therein, a conduit leading through check valves to both sides of the piston, and means outside of the shock absorber for supplying fluid to said conduit.

4. In a shock absorber, the combination of a casing, a piston movable therein and having an operating shaft, packing around said shaft, means comprising a leakage groove inside of said packing, means comprising a conduit leading from said leakage groove through check valves to both sides of the piston, and means outside of the shock absorber connected to supply fluid to said conduit.

5. In a shock absorber, the combination of a casing, a piston operating therein, a conduit connected through check valves to both sides of said piston, means comprising a leakage groove connected to said conduit, means comprising an auxiliary supply chamber in said casing connected to said conduit, and means outside of said shock absorber connected to said conduit for supplying additional fluid thereto.

6. In a motor vehicle, the combination of a hydraulic shock absorber having a fluid containing chamber and a piston, a jointed link connection for said shock absorber piston, means for supplying lubricant to the joints of said link connection, and means comprising a conduit from said link connection to the shock absorber chamber for supplying additional fluid thereto.

7. In a motor vehicle, the combination of a hydraulic shock absorber, a jointed link connection for said shock absorber, means for supplying lubricant to the joints of said link connection, means comprising a conduit from said link connection to the shock absorber for supplying additional fluid thereto, and a filter between the link connection and said shock absorber.

8. In a motor vehicle, the combination of a shock absorber having a fluid casing, a piston in the casing and pivoted links, a chassis lubricating system connected with the links, and conduit means for conducting lubricant from the links to the shock absorber casing.

9. In a motor vehicle, a hydraulic shock absorber having a casing and a piston in the casing having a passage therethrough opening into the casing, a source of fluid supply external of the casing, and a connection between the source of fluid supply and the passage in the piston.

10. In a motor vehicle, a hydraulic shock absorber having a piston containing casing, pivotally connected link members intermediate the vehicle chassis and the shock absorber piston, a chassis lubricating system connected to move lubricant through one of the links to the pivotal connection, and conduit means extending from the pivotal link connection to the piston through which lubricant passes into the casing.

11. In a motor vehicle, the combination of a shock absorber having a piston chamber adapted to contain oil as the working fluid, and a chassis lubricating system connected to supply oil as the working fluid to the chamber of said shock absorber.

12. In a motor vehicle, the combination of a shock absorber having a piston chamber adapted to contain oil as the working fluid, a chassis lubricator adapted to lubricate some of the chassis bearings, and means supplying oil from the lubricator to the chamber of said shock absorber as the working fluid therefor.

13. In a motor vehicle, the combination of a hydraulic shock absorber mounted on an axle, said shock absorber having a piston chamber adapted to contain oil as the working fluid, a vehicle lubricator device, and means for supplying oil from the lubricator device to the shock absorber chamber to serve as the working fluid therein.

14. In a motor vehicle, the combination of a hydraulic shock absorber having a casing forming a piston chamber adapted to contain oil as the working fluid, a chassis oiling system, and a connection between the system and the shock absorber chamber for supplying oil as the working fluid in the chamber.

ALFRED MOORHOUSE.